Figures 1, 2:
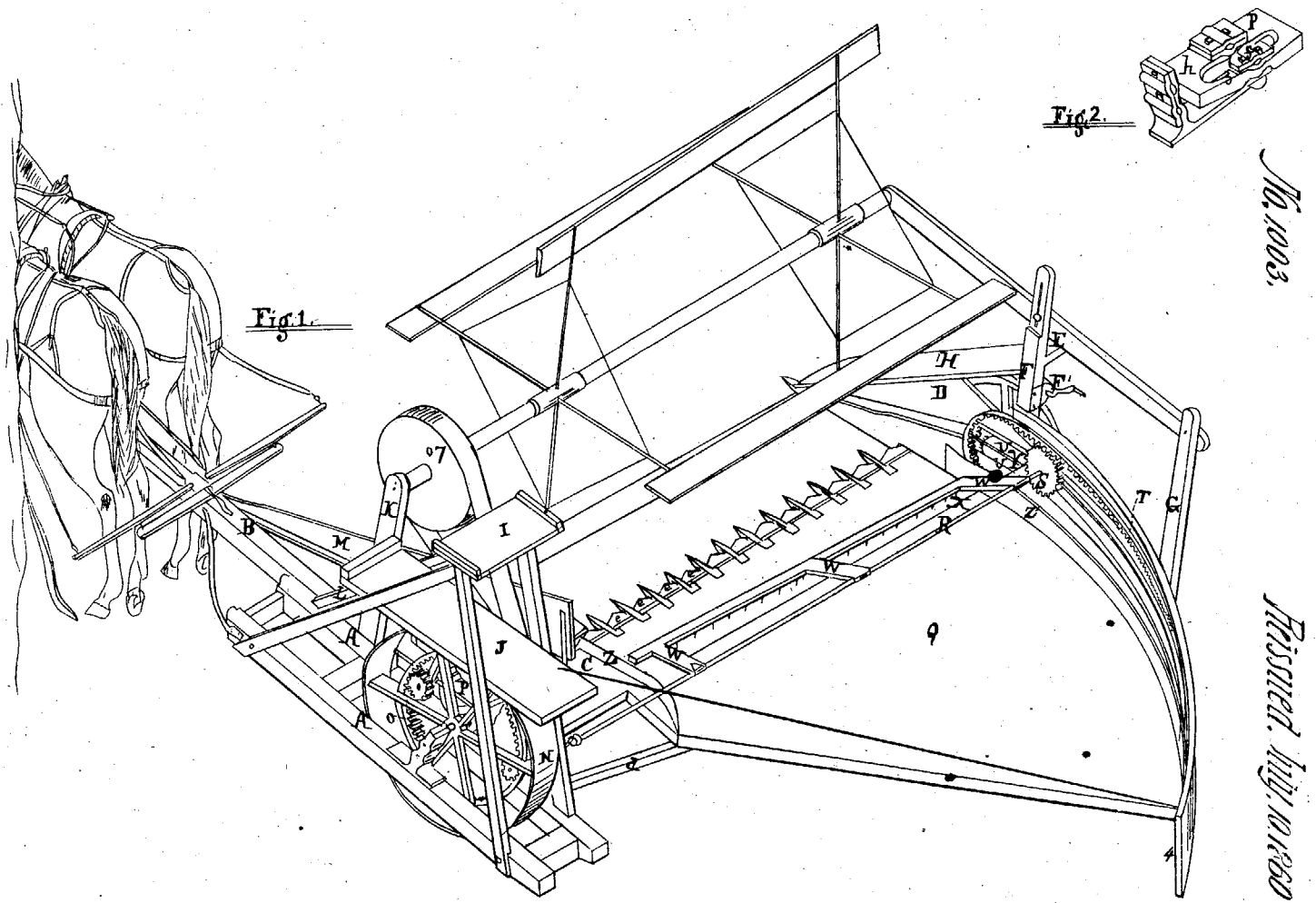

2 Sheets: Sheet 1

W. H. Seymour.

Harvester Rake.

No. 1003. Reissued. July 10 1860

Witnesses: Charles S. Hughes, Augustus Pohlens

William H. Seymour
By O. S. A. Beck
his Attorney

2 Sheets. Sheet 2.
W. H. Seymour.
Harvester Rake.
No. 1003. Reissued. July. 10. 1860.
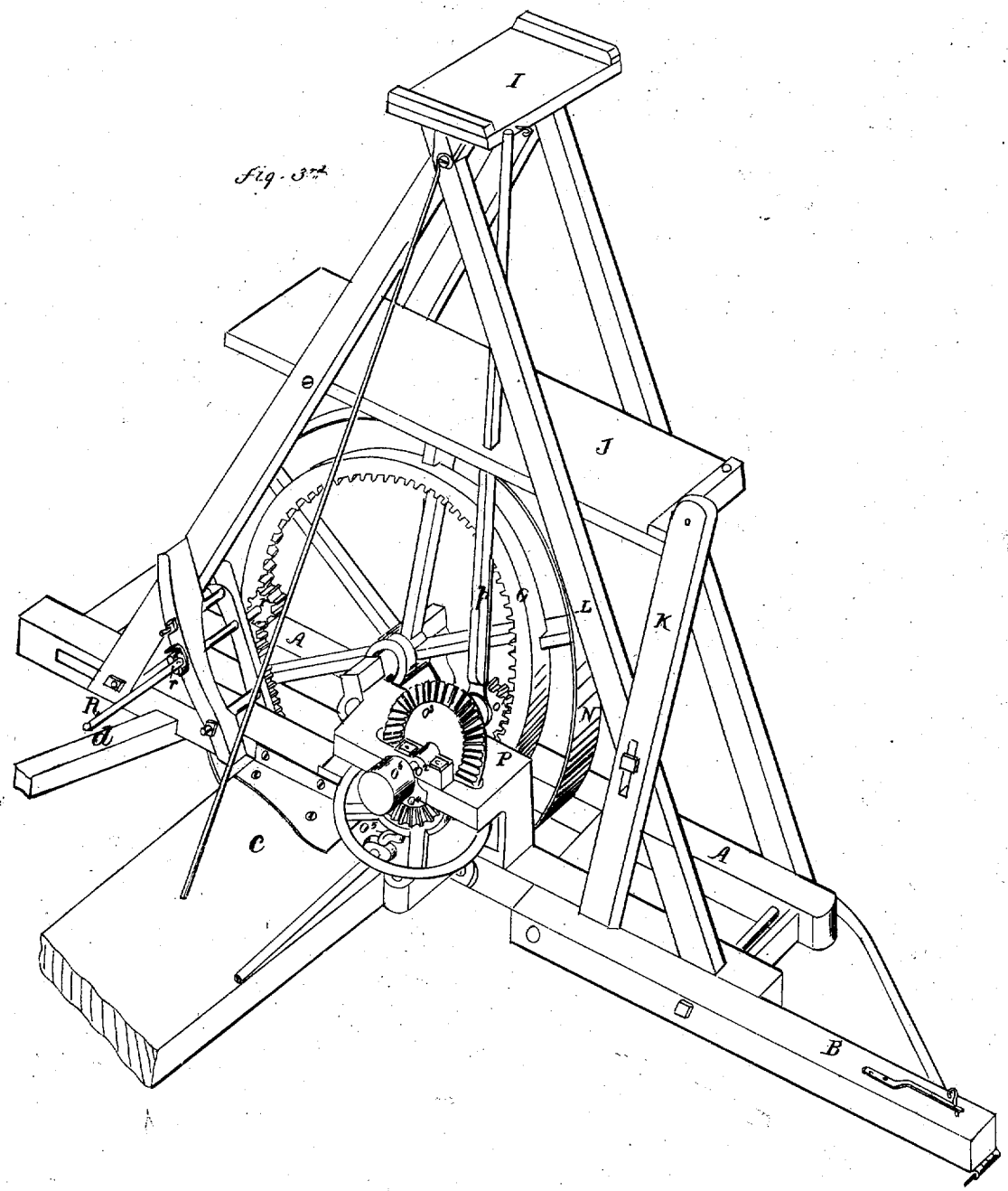

UNITED STATES PATENT OFFICE.

WM. H. SEYMOUR, OF BROCKPORT, NEW YORK, ASSIGNOR TO HIMSELF, D. S. MORGAN, A. PALMER, AND S. G. WILLIAMS.

IMPROVEMENT IN REAPING-MACHINES.

Specification forming part of Letters Patent No. 8,212, dated July 8, 1851; Reissue No. 1,003, dated July 10, 1860.

DIVISION A.

*To all whom it may concern:*

Be it known that I, WILLIAM H. SEYMOUR, of Brockport, in the county of Monroe and State of New York, have invented new and useful Improvements in Reaping-Machines for Cutting all Kinds of Small Grain; and I do hereby declare that the following is a full and exact description of the construction and operation of the same, reference being had to the annexed drawings, making a part of this specification, in which—

Figure 1 represents a view in perspective of a reaping-machine to which my improvements are applied as it would appear to a spectator in the rear and on the stubble side thereof. Fig. 3 represents a similar view of the gearing-frame as it would appear to a spectator stationed at the point of the divider and looking toward the driving-wheel; and Fig. 2 represents an isometrical view of what I term a "combination of boxes in one casting," in which the gearing is mostly supported.

Sweep or vibrating rakes for harvesters as constructed previous to the date of my invention were supported in bearings on the end nearest their center of motion only, and the gearing by which they were vibrated was similarly situated. This method of construction necessarily involved the use of stronger, heavier, and more costly mechanism than would be necessary in a machine of the same size were the rake supported at each end, as the strain upon the parts is necessarily much greater, and this evil increases rapidly as the cutting and raking parts of the machine are extended.

It is the object of my invention to provide a remedy for the foregoing among other evils incident to this mode of construction; and to this end the invention claimed under this patent consists, first, in supporting the arm, rod, or lever which carries the head of an automatic sweep or vibrating rake at each end; and, secondly, in vibrating said rake by means of gearing located partly on the grain and partly on the stubble side of the machine, thereby avoiding the strain, both upon the rake and gearing, necessarily resulting from the employment of a support at one end only of the rake.

A convenient arrangement of mechanism for accomplishing the objects of my invention is shown in the accompanying drawings, which represent a harvesting-machine having an automatic rake.

The main or wheel frame A is constructed of two pieces of timber framed parallel to each other, and connected by three girts—one in the rear of the driving-wheel and two in front.

The tongue B, to which the team is attached, is bolted to the front end of the inner side piece of the wheel-frame.

The finger-beam or guard-piece C is attached to the inner side piece of the frame A (directly under the axle of the driving-wheel) by means of a cast-iron bracket and bolts. To the opposite end of the guard-piece C is attached the divider-piece D, which extends about three feet back of it and two and a half feet in front of it.

A brace, *d*, extends from the back end of the wheel-frame A to the back end of the divider-piece D.

The reel-bearer E is supported by the posts F and G, which extend up from the divider-piece D. The reel-bearer extends in front of the wheel-post F about three feet, and has one end of the reel-shaft hung upon its front end.

The divider-board H is made fast to the front end of the divider-piece. It is also secured to the wheel-post F about two feet above the dividing-piece.

The seat I, for the operator, is constructed by four braces extending up from the wheel-frame A—one from each corner of the frame—forming two triangles parallel to each other, to the top of which the seat is attached. The foot-board J is bolted to these braces.

The reel-post K, the lower end of which is inserted into a mortise in the inner side piece of the frame A, near its front end, passes up at the side of the diagonal brace L, to which it is attached by a bolt passing through a slot in it, and also through one in the brace. This post (to the upper end of which one end of the reel-shaft is hung) is supported in this manner to admit of its being raised and lowered to vary the height of the reel.

A guard-board, M, extends from the tongue

B to the guard-piece C for the purpose of bringing the grain to the sickle. A brace, of three-fourths inch round iron, extends from the tongue to the guard-piece, directly under the guard-board.

The driving-wheel N (three feet or more in diameter) is of cast-iron, but might be made of wood, and is hung on an axle that has its bearings (of cast-iron) bolted upon the upper side of the frame A. An internal spur cog-wheel, O, is cast upon the arms of the driving-wheel.

A pinion, $o'$, which is hung on a transverse shaft, $o^2$, that has its bearings attached to the cast frame P, in manner hereinafter described, meshes into this spur-wheel O. A bevel-wheel, $o^3$, about one foot in diameter, is hung on this shaft and meshes into a bevel-pinion, $o^4$, hung on a vertical crank-shaft, $o^5$, that has its upper bearing in a box supported in the cast-iron frame P and its lower bearing in a step bolted upon the inner side piece of the frame A.

The combination-box or cast frame P, Fig. 2, in which the gearing is mainly hung, has a long broad base, and is bolted to the inner side piece of the frame A. Near the back end of the base is an elevation of six or eight inches, to the back part of which is bolted another piece of casting, and thus two boxes are formed (one above the other) for the inner end of the axle of the driving-wheel, which axle is shifted from one to the other of these boxes to vary the height of cut. There is another elevation at the front end of the base, corresponding in height nearly with the one at the back end, and the upper-plate part of said cast frame or combination-box extends from one of these elevations to the other, as shown at *h*, Fig. 2, and is made broader than the base or elevations, so as to project beyond them, as shown at 3, Fig. 2. Near the center of this upper plate there is a slot made, in which the bevel-wheel is placed, its shaft being supported at each end by bearings on this plate. The upper crank-box, 4, is bolted to the under side of this plate, directly under the bevel-wheel box *f*. By this arrangement of the gearing it is more compact than it could otherwise be made, and admits of a pitman-rod of sufficient length being used without the necessity of widening the machine to make room for the pitman-rod, which would have to be done were the gearing not thus compactly arranged.

The mechanism can be thrown into or out of gear at will by means of a disconnecting-lever, *p*, which operates a sliding clutch on the driving-shaft $o^2$. The sickle *e e e* is attached to the crank by means of a rod or pitman one and a half foot long, which gives the sickle a quick vibrating motion. The crank is two inches in length, and gives the sickle a stroke of four inches. There is a pulley, $o^6$, four and a half inches in diameter, on the inner end of the bevel-wheel shaft, and another pulley, $o^7$, of nineteen inches in diameter, on the reel-shaft, in range with it, over which pulleys runs a belt that gives motion to the reel.

The reel is made and operated in the usual manner.

The guard-teeth *o o o o*, eighteen in number, (more or less,) are six inches long, made of cast-iron, and attached to the guard-piece C by means of wood-screws in their front edges and on their tops. These guard-teeth have slots through them, through which the sickle vibrates, which slots are enlarged back of the sickle to prevent clogging.

The side of the machine opposite the driving-wheel is carried on a wheel two and a half feet in diameter, the axle of which slides vertically in guides secured upon the post F, in which guides it is raised or lowered by means of a rack and pinion, F′.

The platform Q, instead of being made in a square form and extending back of the sickle only three or four feet, as heretofore, is extended back in a circular form, as shown in the drawings, that the grain, instead of being raked off behind the machine, as heretofore, making it necessary to take up each swath as it is cut, is swept off on a circle and dropped far enough from the standing grain to be out of the way of cutting the next swath, thereby obviating the necessity for taking up each swath before another can be cut. The guards Z Z′ prevent the grain from falling off the platform or from becoming entangled in the gearing. The grain is raked from the platform of the machine by means of a rake that is made to travel back and forth in the following manner:

The rake consists of the head V, into which the teeth are inserted, the attachments W W W, the lower ends of which are firmly secured to the rake-head, the guide-rod X, passing through the attachments W W W, parallel to the rake-head V and about the center of the rake, and the lever, arm, or rake-rod R, which extends horizontally across the platform and through the upper ends of the attachments W W W, so as to revolve freely therein. A pinion, *r*, of twelve cogs, (may be more or less,) is secured upon the end of the rake-rod R, which pinion meshes into the internal spur-wheel, O, and causes the rod to revolve. This rod is provided with a universal joint, *r′*, a few inches from the pinion *r*. The short section of the rod between the joint and the pinion is supported in a horizontal transverse position (with respect to the plane of the driving-wheel) by bearings secured upon the wheel-frame A, the universal joint thus forming the center of motion of the rake, as hereinafter more fully described. Another pinion, S, is secured on the rake-rod near its outer end, and is provided with cogs (or some irregular surface) to correspond with those of an endless rack, T, having internal teeth, in which it travels. This endless rack T has parallel sides and semicircular ends, and is to be made of the shape required to produce the requisite motions of the rake, as hereinafter described. It is secured upon the outer or grain end of the platform, and is so curved that in its top view it forms the arc of a circle of which the universal joint $r'$ forms the center and the rake-rod R the radius. This rod R also extends through the pinion S and projects beyond it—say half an inch—in order that it may roll along the edge of the guide-plate U, which plate is secured in the center of the endless rack, with its edges parallel to the sides thereof, and holds the pinion S in contact with the teeth of the rack in every part of its circuit, and also acts as a support to the outer end of the rake-rod. The guide-rod X passes through one or more of the attachments W W W, and extends beyond the pinion S into the horizontal groove Y in the center of the endless rack T, as well as in that of the guide-plate U. It also projects beyond the outer end of the rake-rod R, that it may at all times continue in the groove.

The operation of the machine is as follows: Suppose the parts to occupy the position shown in Fig. 1. As the machine advances the pinion $r$ and rake-rod R are caused to revolve, which causes the pinion S to roll along from front to rear of the platform in contact with the teeth of the upper side of the endless rack T, against which it is held by the projecting end of the rake-rod R, which rolls along the upper edge of the guide-plate U, and which supports the outer end of the rake. The guide-rod X travels in the groove Y, and as it is below the level of the pinion S while the latter is in contact with the upper teeth of the rack the points of the rake-teeth are held firmly down upon the platform while raking off the grain, which is swept around on an arc of a circle of which the universal joint $r'$ forms the center, and discharged, heads foremost, upon the ground at the side of the machine, behind the driving-wheel and far enough removed from the standing grain to be out of the path of the team when the machine comes round in cutting the next swath. When the pinion S has arrived at the rear end of the rack T, which point is marked 4 in the drawings—that is, when the gavel has been discharged—it descends until the lower side of the rack is reached, when it begins to run forward, being held down upon the teeth of the rack by the lower side of the guide-plate U. As the pinion descends it passes below the level of the groove Y, in which the guide-rod X travels, and as this rod forms the fulcrum of the rake its teeth are correspondingly elevated and held up until the pinion S reaches the limit of its forward motion, which point is marked 3 in the drawings. When the pinion S begins to ascend the curved end of the rack the guide-rod slips into a slot in the forward end of the rack, which slot forms a continuation of the groove Y, and is of a depth sufficient to permit the pinion S to rise without obstruction from the guide-rod. As the pinion rises the rake-teeth are correspondingly depressed, the guide-rod X still forming the fulcrum, and by the time the pinion has reached the upper side of the endless rack the rake-teeth are firmly pressed upon the platform. By this method of operation the rake is always supported at its outer as well as its inner end, thereby materially diminishing the tendency of the parts to twist or bend, and the consequent liability on the part of the gearing to become bound. Moreover, the rising and falling movements of the rake-head, being produced by the vertical movements of the rake-rod itself, are greatly and yet quickly accomplished without jar or strain on the machinery, and with much greater facility than if it were necessary to lift a weight, overcome the tension of a spring, or even to unfasten a latch. This method of applying the power to the rake will admit of the adaptation of the machine to cutting a wider swath with but little additional expense.

The operation of the other parts of the machine is so well known to those skilled in the art of constructing reaping-machines that any further description of them is deemed unnecessary here, especially as they form no part of the subject-matter herein claimed.

What I claim under this patent as my invention is—

1. Supporting the arm or lever of a vibrating sweep-rake at each end, substantially as described.

2. Operating an automatic sweep-rake by gearing on both ends thereof, in combination with the platform of the harvesting-machine for delivering the grain in gavels, substantially as described.

WM. H. SEYMOUR.

Witnesses:
CHAS. W. PALMER,
CHAS. MERIAM.